United States Patent
Desmeure et al.

(10) Patent No.: US 10,984,153 B2
(45) Date of Patent: Apr. 20, 2021

(54) METHOD OF DETERMINING A MAXIMUM ACCEPTABLE ALTERNATING STRESS FOR A PART THAT IS SUBJECTED TO CYCLIC LOADING; A UNIT FOR DETERMINING SUCH A STRESS

(71) Applicant: SAFRAN AIRCRAFT ENGINES, Paris (FR)

(72) Inventors: Geoffrey Juan Desmeure, Moissy-Cramayel (FR); Francois Pierre Michel Comte, Moissy-Cramayel (FR); Anais Suzanne Amelie Gaubert, Moissy-Cramayel (FR); Arnaud Cyril Longuet, Moissy-Cramayel (FR); Marine Laetitia Camille Chevalier, Moissy-Cramayel (FR); Michael Piers Hansom, Moissy-Cramayel (FR); Lucie Marie Ida Lanciaux, Moissy-Cramayel (FR)

(73) Assignee: SAFRAN AIRCRAFT ENGINES, Paris (JP)

(*) Notice: Subject to any disclaimer, the term of this patent is extended or adjusted under 35 U.S.C. 154(b) by 458 days.

(21) Appl. No.: 15/748,024

(22) PCT Filed: Jul. 19, 2016

(86) PCT No.: PCT/FR2016/051853
§ 371 (c)(1),
(2) Date: Jan. 26, 2018

(87) PCT Pub. No.: WO2017/017343
PCT Pub. Date: Feb. 2, 2017

(65) Prior Publication Data
US 2018/0232472 A1 Aug. 16, 2018

(30) Foreign Application Priority Data

Jul. 27, 2015 (FR) .................................. 1557145

(51) Int. Cl.
*G06F 30/15* (2020.01)
*G06F 30/20* (2020.01)
(Continued)

(52) U.S. Cl.
CPC ............... *G06F 30/20* (2020.01); *G01N 3/32* (2013.01); *G06F 30/15* (2020.01); *G01N 2203/0214* (2013.01); *G06F 2111/10* (2020.01)

(58) Field of Classification Search
CPC ...... G06F 30/20; G06F 30/15; G06F 2111/10; G01N 3/32; G01N 2203/0214
(Continued)

(56) References Cited

U.S. PATENT DOCUMENTS

| 5,517,079 A * | 5/1996 | Seder ..................... H01J 61/067 313/491 |
| 5,725,354 A * | 3/1998 | Wadia ..................... F01D 5/147 416/224 |

(Continued)

OTHER PUBLICATIONS

International Search Report dated Nov. 15, 2016, in PCT/FR2016/051853 filed Jul. 19, 2016.

(Continued)

Primary Examiner — Thai Q Phan
(74) Attorney, Agent, or Firm — Oblon, McClelland, Maier & Neustadt, L.L.P.

(57) ABSTRACT

A method of determining a maximum acceptable alternating stress at a point of a part subjected to cyclic loading: simulating that the part is subjected to constant loading equal to a threshold value during a level period, and assuming that the part has elasto-viscoplastic behavior; from the results of the simulation, determining a final static stress at (Continued)

the point at the end or after the end of the level period; and for the point under consideration, using a Goodman diagram to determine the maximum acceptable alternating stress, which is determined for a static stress equal to the final static stress; the duration of the level period being equal to the duration of the loading of the testpieces that were used to draw up the Goodman diagram.

10 Claims, 7 Drawing Sheets

(51) Int. Cl.
  *G01N 3/32* (2006.01)
  *G06F 111/10* (2020.01)
(58) Field of Classification Search
  USPC .................. 703/2, 5, 7; 702/181; 73/577
  See application file for complete search history.

(56) References Cited

U.S. PATENT DOCUMENTS

| | | | | |
|---|---|---|---|---|
| 6,184,285 | B1* | 2/2001 | Hatfield | C09J 153/02 |
| | | | | 524/505 |
| 6,601,456 | B1* | 8/2003 | Davidson | G01N 3/56 |
| | | | | 73/7 |
| 10,513,930 | B2* | 12/2019 | Roche | F01D 5/286 |
| 10,564,066 | B2* | 2/2020 | Greaves | G01M 7/022 |
| 2005/0081397 | A1* | 4/2005 | Bonham | G02B 6/4226 |
| | | | | 33/645 |
| 2006/0073022 | A1* | 4/2006 | Gentile | F01D 5/16 |
| | | | | 416/223 R |
| 2012/0065934 | A1* | 3/2012 | Shimanuki | G01N 3/32 |
| | | | | 702/181 |
| 2012/0133448 | A1* | 5/2012 | Gregg | G01N 3/32 |
| | | | | 331/116 R |
| 2013/0108460 | A1* | 5/2013 | Szwedowicz | B22F 3/1055 |
| | | | | 416/241 R |
| 2016/0047709 | A1* | 2/2016 | Gower | G01M 5/0033 |
| | | | | 73/577 |
| 2016/0082547 | A1* | 3/2016 | Szwedowicz | G05B 19/4099 |
| | | | | 700/98 |
| 2016/0246287 | A1* | 8/2016 | Modgil | G05B 23/0245 |
| 2016/0349744 | A1* | 12/2016 | Czerniak | G01M 15/14 |
| 2017/0350785 | A1* | 12/2017 | Greaves | G01M 5/0033 |
| 2019/0033152 | A1* | 1/2019 | Mori | G01L 27/02 |

OTHER PUBLICATIONS

Cernil Bagci, "Fatigue Design of Machine Elements Using the "Bagci Line" Defining the Fatigue Failure Surface Line (Mean Stress Diagram)", Mechanism and Machine Theory, vol. 16. No. 4, 1981, 21 pages.

N.S Vyas et al., "Fatigue Life Estimation Procedure for a Turbine Blade Under Transient Loads", Journal of Engineering for Gas Turbines and Power, vol. 116. No. 1, Jan. 1994, 9 pages.

* cited by examiner

METHOD OF DETERMINING A MAXIMUM ACCEPTABLE ALTERNATING STRESS FOR A PART THAT IS SUBJECTED TO CYCLIC LOADING; A UNIT FOR DETERMINING SUCH A STRESS

FIELD OF THE INVENTION

The invention relates to means and methods serving to determine the maximum acceptable alternating stress at a point of a part that is to be subjected to substantially cyclic loading. Such loading may typically be centrifugal forces applied to rotating parts of rotary machines, or indeed loading applied to parts that are stationary, but arranged in the proximity of rotating parts.

TECHNOLOGICAL BACKGROUND

The invention lies in the context of certain modeling assumptions, as described below. These assumptions are themselves known in mechanics, for studying the dynamic behavior of parts.

According to these assumptions, it is considered that the stress that is developed within a part being subjected to cyclic loading is the sum of two terms: a static stress term $\sigma_{stat}$ that is the portion of the stress that varies slowly; and an alternating stress term $\sigma_{alt}$ that is the portion of the stress that varies quickly; this last term contains in particular the cyclic or substantially cyclic variations in the stress, at a frequency that is significantly higher than the frequency of the static stress $\sigma_{stat}$.

The static stress $\sigma_{stat}$ may be considered as being a value for the (total) stress $\sigma$ as smoothed over time.

Thus, it is considered that the tensors of the static stresses and of the alternating stresses are related by the equation:

$$\sigma = \sigma_{stat} + \sigma_{alt}$$

The "maximum acceptable alternating stress" written $\sigma_{alt\_max}$ for a material subject to cyclic loading, designates the maximum alternating stress that the material can withstand when it is subjected to a predetermined number of loading cycles. This maximum acceptable alternating stress $\sigma_{alt\_max}$ is defined at a given instant as a function of the static stress $\sigma_{stat}$ to which the material is subjected at that instant, with the value of this static stress $\sigma_{stat}$ itself resulting from the various kinds of loading applied to the part.

Usually, the maximum acceptable alternating stress $\sigma_{alt\_max}$ relating to a material is determined by performing cyclic loading tests on testpieces made of that material. The tests are performed at a temperature that is predetermined and for a predetermined number of cycles. The predetermined temperature usually corresponds to the temperature to which the material is taken in operation; the number of cycles is defined as a function of the number of loading cycles to which the material is subjected throughout the expected lifetime of the part of which it forms a portion.

The term "part" is herein equally well to designate either a part that is made integrally, or else a set of distinct parts that are connected together. It is used herein essentially to designate parts that are rigid (or substantially rigid), and it excludes hinged assemblies and fluids.

The above-mentioned cyclic loading tests are performed for various loading values and they serve to establish a Goodman diagram for the material, in known manner.

A Goodman diagram is a diagram plotting the static stresses to which the material is subjected along the abscissa axis, and the alternating stresses to which the material is subjected up the ordinate axis The diagram shows the maximum acceptable alternating stress to which the material may be subjected without breaking as a function of the static stress to which the material is subjected, when the material is subjected to a predetermined number of loading cycles (e.g. $10^7$ cycles) while being taken to the likewise predetermined temperature.

Also, in order to determine whether a part as defined in particular by shape (its three-dimensional model) and by its material, is suitable for withstanding the mechanical loading to which it is to be subjected, it is usual to proceed as follows:

a) simulating digitally the behavior of the part over a certain period of time, during which the part is subjected to the expected loading; the simulation is performed while taking account of an elastic behavior model for the material;

b) at the end of the simulation, determining the static stress and the alternating stress to which the point under consideration of the part have been subjected; and c) for this static stress value, using a Goodman diagram (established by the above-described method) to determine whether the alternating stress in the material at the point under consideration is less than the maximum acceptable alternating stress.

Unfortunately, in particularly when developing parts that are subjected to high temperatures, and in particular that are subjected to loading at relatively high frequency (more than 1000 hertz (Hz)), e.g. the high pressure turbine blades of an aviation turbine engine, it is found that the above method does not give satisfactory results. Specifically, that method leads to preventing the use of certain materials or certain shapes for parts in certain applications, even though in practice, experience shows that those materials and/or those parts shapes can he selected for the applications under consideration.

Figure 1:
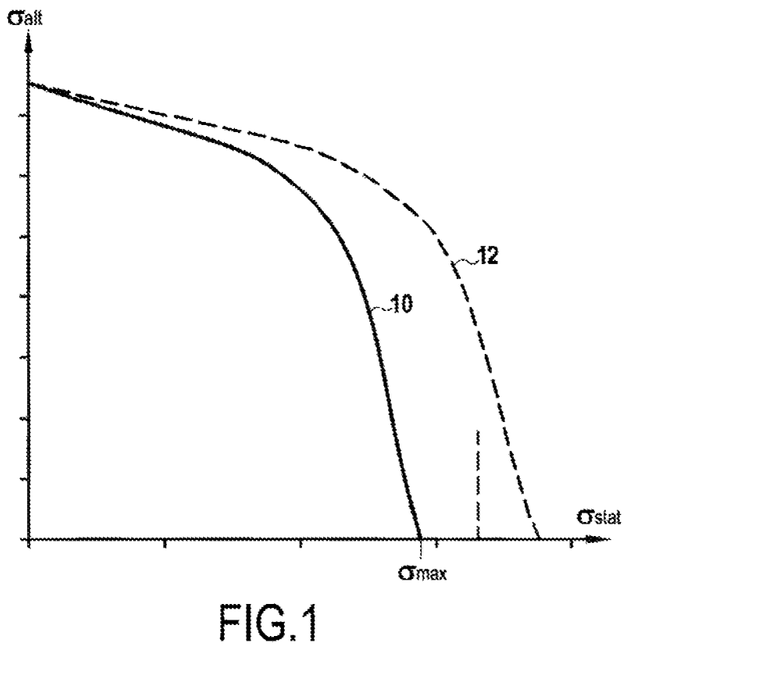
FIG. 1, described above, is a diagrammatic view based on a traditional Goodman diagram, having superposed thereon a curve of an effective Goodman diagram.

This phenomenon can be better understood from FIG. 1.

This figure is the Goodman diagram associated with a material (curve 10) in comparison with a theoretical curve corresponding to the real behavior of the material (curve 12).

In this figure, the abscissa axis gives the static stress $\sigma_{stat}$ in the material at the point under consideration, and the ordinate axis gives the alternating stress $\sigma_{alt}$ at that point.

The curve 10 is the curve of the Goodman diagram representing the behavior of the material under consideration, at a given temperature T, and for a predetermined number N of cycles (specifically $10^7$ cycles).

The points of the curve 10 are points at which the material breaks immediately after the number N of cycles, i.e. $10^7$ cycles. Consequently, the points of the diagram that lie under the curve 10 have static stress values $\sigma_{stat}$ and alternating stress values $\sigma_{alt}$ at which the material breaks for a number of cycles that is greater than $10^7$, and conversely, the points of the diagram that lie above the curve 10 have static stress values $\sigma_{stat}$, and alternating stress values $\sigma_{alt}$ for which the material breaks for some number of cycles that is less than $10^7$.

The curve 10 is a curve drawn up by performing cyclic traction tests on testpieces made of the material under consideration, taken to the temperature T, and for various values of static stress $\sigma_{stat}$.

Because of the limitations of traction test machines, which in practice cannot operate at frequencies higher than 100 Hz, Goodman diagrams are representative of the behavior of the material mainly when the loading applied to the material varies at a frequency that is likewise less than or equal to 100 Hz.

It can thus be understood that those conditions are too restrictive and often do not represent the frequencies of the loading that is actually applied to parts, which frequencies can be much higher.

According to the Goodman diagram, it should not be possible to use parts in which the static stress to which the material is subjected is greater than a value $\sigma_{max}$ shown in FIG. 1.

However, it has been found that in practice that numerous parts withstand such stresses.

It can be deduced therefrom that the curve that ought to be drawn to represent the real behavior of the material is not the curve 10, but rather a curve, of the type of the curve 12, that is offset relative to the curve 10.

Consequently, a Goodman diagram of the kind described above, and the method of verifying the suitability of a part for being subjected to certain kinds of loading, as defined above in steps a) to c), cannot always be used for realistically evaluating whether a part, as defined in particular by its shape and its material, is suitable for being subjected to a certain predetermined number of loading cycles without breaking.

SUMMARY OF THE INVENTION

The object of the invention is thus to overcome the shortcomings described above.

For this purpose, the invention proposes determination method for determining a maximum acceptable alternating stress at a point of a part that is to be subjected to substantially cyclic loading, that give a value for the maximum acceptable alternating stress at the point under consideration of the part.

The values for the maximum acceptable alternating stress as determined in this way may be used to verify that the alternating stress does not exceed the maximum acceptable alternating stress at any point of the part under consideration.

This result is achieved by the fact that the method comprises the following steps:

a) digitally simulating that the part is subjected, during a level period, to constant loading equal to a threshold value;

the simulation taking account of a elasto-viscoplastic (EVP) model of behavior for a material constituting the part at the point under consideration;

b) from the results of the simulation, determining a final static stress at said point at the end or after the end of the level period; and c) for the point under consideration of the part, using a first Goodman diagram to determine the maximum acceptable alternating stress $\sigma_{alt\_max}$, which is determined for a static stress equal to the end-of-level-period stress $\sigma_{stat\_fin}$;

the duration of the level period being substantially equal to the duration of the loading of the testpieces that were used to draw up said first Goodman diagram.

In the method as defined above, the various stresses that are mentioned (e.g. static stress, etc.), are either tensors, or else scalar magnitudes (real numbers); the nature of the stress under consideration should be determined as a function of the context.

In particular, during step b), the final static stress that is supplied by the digital simulation is generally a tensor.

On the basis of this value of the tensor, the final static stress $\sigma_{stat\_fin}$ is calculated for the end-of-level-period instant: this stress is calculated in scalar form.

It is this (scalar) value $\sigma_{stat\_fin}$ that is used in step c) for determining the maximum acceptable alternating stress $\sigma_{alt\_max}$.

The value of the stress, in scalar form may be calculated in various ways as a function of the stress tensor in the part. Usually, the scalar stress that selected is the Von Mises stress nevertheless, it possible, while remaining within the context of the invention, for the value of the stress in scalar form to be defined in some other way from the stress tensor. For example, it may be a maximum principal, or some other stress.

Advantageously, the invention is applicable to parts that are subjected to loadings of any kind: mechanical, thermal, or other.

The loading may comprise point, linear, or area forces.

Loading in the form of a force field or that can be considered as being a force field, such as centrifugal forces, may naturally also be taken into account as loading in the context of the invention.

The loading may also be defined in the form of conditions at limits, such as for example conditions at limits of position, speed, and/or acceleration.

It can be understood that in the above-defined method, simulation step a) may include not only the level period, but also other periods during which the behavior of the part is simulated, these periods possibly extending before and/or after the level period.

Thus, in a preferred implementation, in step a), it is simulated digitally that, prior to the level period, the part is subjected to loading rising from a zero value up to the threshold value, during a loading rise period. The simulation taking account of this loading rise period makes it possible to represent in more realistic manner the rise in the stresses within the part under the effect of the applied loading.

An important characteristic of the above-defined method of the invention is that in order to represent the behavior of the material, it takes account of an elasto-viscoplastic (EVP) behavior model.

A simulation that takes account of "an elasto-viscoplastic (EVP) behavior model" for the material is material simulation in which:

the deformation ε of the material is the sum of a term representing its elastic deformation $\varepsilon_e$ plus a term representing its visco-plastic deformation $\varepsilon_p$; and the stress σ to which the material is subjected is a function in particular of the rate of plastic deformation of the material $d\varepsilon_p/dt$.

In the context of the invention, any elasto-viscoplastic (EVP) behavior model may be used.

The step a) of digitally simulating the behavior of the part may be performed while taking account of the elasto-viscoplastic (EVP) behavior of the material either during iterative calculation steps, or else in post-processing.

In the first situation, with iterative steps, during the simulation step a), at each point of the material at least in the zone under study of the part, the above-specified deformation ε is equal to the sum of an elastic deformation term $\varepsilon_e$ plus a plastic deformation term $\varepsilon_p$.

Advantageously, while the invention is being performed, there is no need to assume elasto-viscoplastic behavior of the material for the entire part: it suffices to make this assumption for the portion of the part that it is particularly desired to study; for the remainder of the part, other behavior assumptions that are simpler may be used, e.g. an elastic behavior model for the material. This assumption may be used for portions of the part that are remote from critical zones.

In the second situation (the elasto-viscoplastic behavior of the material is taken into account in post-processing), the simulation comprises two steps:

a1) calculating "elastic" deformation $\varepsilon_e$ of the material using elastic type calculation; and then a2) determining the deformation $\varepsilon$ of the material by summing the raw deformation $\varepsilon_e$ calculated beforehand plus a correction term $\varepsilon_p$. This correction term represents the viscoplastic deformation $\varepsilon_p$ of the material; by way of example, it may be determined the basis of local energy equivalence or by using a change-of-scale approach.

In this second situation, at the end of the second calculation step, an estimate is obtained for the total deformation that includes a plastic or viscoplastic portion.

The method is particularly useful for determining the maximum acceptable alternating stress for parts that are subjected to high temperatures, i.e. more precisely to temperatures that give rise to significant damage to the material due to creep. By way of example, such temperatures may be temperatures higher than 750° C., at which the traditional method described in the introduction is found to be particularly inaccurate.

Advantageously, as a result of the material behavior model that is used, the method of the invention provides results that are satisfactory over a wide range of load ratios R.

The term "load ratio" is used to designate the following parameter R:

$$R=(\sigma_{stat}-\sigma_{alt})/(\sigma_{stat}+\sigma_{alt})$$

When the load ratio R is small, the static stress $\sigma_{stat}$ is small; the alternating stress may possibly be of most importance; and the fatigue phenomenon has a role that is preponderant, in particular compared with the creep phenomenon.

Conversely, when the load ratio R is high, the static stress $\sigma_{stat}$ is high; the alternating stress is then, on the contrary, normally of minor importance; the creep phenomenon has a role that is preponderant, in particular compared with the fatigue phenomenon.

Advantageously, using an elasto-viscoplastic model makes it possible to take account of these two simultaneous phenomena (creep and fatigue), in particular by taking account of elastic deformation $\varepsilon_e$ and viscoplastic deformation $\varepsilon_p$; it also makes it possible to take account of the dynamics of the loading applied to the material because the rate of plastic deformation is involved in calculating the stress to which the material is subjected.

More particularly, the phenomenon of creep in the material is taken into account because it is simulated that the loading applied to the material presents a level, and does so for a certain period during which the loading is stabilized at the threshold value.

Specifically, it is found that although the real loading applied to the part is cyclic, a simplified simulation that takes account not of the cyclic loading but of loading that presents a level, gives results concerning static stress $\sigma_{stat}$ that are close to those obtained when cyclic loading is taken into account, and that consequently are suitable for being used.

For this purpose, concerning the duration of the level period, it is appropriate to select a duration that is substantially equal to the duration of the loading of the test that were used for plotting the Goodman diagram that is used in step c). The term "substantially equal" is used herein to mean a level duration that is equal to the Goodman diagram duration ±30%, and preferably equal to the Goodman diagram duration ±15%. The simulated duration of the level portion is thus not related to the real duration of use of the part or its lifetime.

The Goodman diagram is drawn up by applying a fixed number N of cycles to the part at a predetermined frequency $f$. The duration of the Goodman diagram is equal to the duration that was necessary for applying the specified number N of cycles, and it is equal to the ratio N/f of the number of cycles N divided by the frequency $f$.

The Goodman diagram should preferably be obtained or estimated at the sane temperature as the temperature of the material during the simulation (step a).

Advantageously, in the method of the invention, the loading applied to the part during the digital simulation step (step a) is particularly simple, since it is constant during the level period. In particular, it much simpler than the cyclic stresses that are, in fact, applied to the material.

Advantageous, the method of the invention can be performed with particularly short computation time, unlike other simulation methods in which it is necessary to simulate applying alternating loading to the part.

Advantageously, the method of the invention is independent of the frequency and/or the amplitude of the loading applied to the part.

Consequently, the method avoids the problems that are encountered in prior methods.

The loading applied to the material during the simulation (step a) may include a rise-in-loading period prior to the level period.

This rise-in-loading period is a period during which the (simulated) loading applied to the part varies (rises) from a zero value to a threshold value.

In the context of the invention, while the loading is rising the loading may either vary in increasing manner (with the loading not decreasing at any moment), or on the contrary in a manner that is not monotonic, i.e. the rise in loading then includes at least one period of increasing loading and at least one period of decreasing loading. By way of example, the rise in loading may include a plurality of alternating increases and decreasing stages in the loading that is applied to the part, By way of example, these alternating stages seek to reproduce the loading that is applied to the part while it is being run in.

In an implementation, the final static that is determined in step b) is the stress at the point under consideration at the end of the level period (under such circumstances, there is no need to simulate the behavior of the part after the level period).

Conversely, in another implementation, in step a it is digitally simulated that the part, after the level period, is subjected to varying loading during a final period after the level period. The final static stress that is, determined in step b) is then an "end-of-final-period" stress that is determined at the point under consideration at the end of said final period.

When the parts being evaluated are aviation turbine engine blades, the final period, following the level period and during which the part is subjected to loading that varies as a function of time, may correspond for example to a stage of an aircraft descending at the end of a flight.

In an implementation, in step c), the maximum acceptable alternating stress is determined using a Goodman diagram that is obtained by correlation or interpolation between at least two Goodman diagrams. These Goodman diagrams may in particular be Goodman diagrams obtained directly by performing tests on testpieces.

The method of the invention is particularly suitable for determining the maximum acceptable alternating stress for a part of a rotary machine, in particular a part of a rotor, such as a blade, for example. In particular, when the part is a part of an aeroengine, in an implementation, during step a), the threshold value of the loading applied during the level period is equal to the mean value of the loading to which the part is subjected during takeoff of an aircraft.

The method of the invention is particularly suitable for determining the maximum acceptable alternating stress for a part that is made of a metal alloy, in particular an alloy of titanium or of nickel.

Advantageously, the invention can ne used to qualify parts. It then serves to determine the suitability of such parts to be subjected to the cyclic loading to which the parts are to be exposed.

For this purpose, the invention also provides method of verifying the suitability of a part for being subjected to substantially cyclic loading, the method comprising the following steps:

A. determining a maximum acceptable alternating stress at at least one point of the part when it is subjected to said loading, by means of the above-described method for determining maximum acceptable alternating stress;

B. evaluating at said at least one point of the part, the alternating stress to which the part is subjected at said at least one point; and C. for each of said at least one point(s) verifying that the alternating stress is less than the maximum acceptable alternating stress at the point under consideration, and concluding that the part is not suitable for being subjected to said loading if the verification is negative for at least one point.

Steps A and B of the method may naturally be performed in any order or in parallel.

Step B is generally performed by performing real tests on the part.

The above-mentioned verification is not performed at all points of the part. In general, it is performed at only a limited number of points, referred to as verification points. When the part is modeled by finite elements, it is possible for all of the vertices of the finite elements that represent the part to be selected as verification points.

In a particular implementation, the various steps of the method of the invention for determining a maximum acceptable alternating stress or the method of the invention for verifying the suitability of a part are determined by computer program instructions.

Consequently, the invention also provides a computer program on a data medium, the program being suitable for being performed in a computer, the program including program code instructions for executing steps of a method for determining a maximum acceptable alternating stress or a method of verifying suitability of a part as described above, when the program is executed on a computer.

The program may use any programming language, and be in the form of source code, object code, or of code intermediate between source code and object code, such as in a partially complied form, or in any other desirable form.

The invention also provides a computer readable data medium including the instructions of a computer program as mentioned above.

The data medium may be any entity or device capable of storing the program. For example, the medium may comprise storage means, such as a read only memory (ROM), e.g. a compact disk (CD) ROM or a microelectronic circuit ROM, or indeed magnetic recording means, e.g. a floppy disk or a hard disk.

Furthermore, the data medium is generally a non-volatile data medium. That said, the program of the invention may in particular be downloaded from an Internet type network. Alternatively, the data medium may be an integrated circuit in which the program is incorporated, the circuit being suitable for executing or for being used in the execution of the method in question.

The invention also provides a determination unit for determining a maximum acceptable alternating stress at a point of a part that is to be subjected to substantially cyclic loading, the unit comprising:

a simulation module configured to simulate digitally that the part is subjected to constant loading equal to a threshold value during a level period;

the simulation module taking account of an elasto-viscoplastic behavior model for a material constituting the part at the point under consideration;

a determination module for determining static stress and configured to determine a static stress at said point of the part at the end of the level period or after the end of the level period; and a determination module for determining the maximum acceptable alternating stress and configured to use a first Goodman diagram to determine the maximum acceptable alternating stress, which stress is determined for a static stress equal to the final static stress;

the duration of the level period being substantially equal to the duration of the loading of the testpieces that were used to draw up said first Goodman diagram.

Finally, the invention also provides a system for qualifying a part that is to be subjected to substantially cyclic mechanical loading, the system comprising:

a determination unit as defined above for determining a maximum acceptable alternating stress and configured to determine a maximum acceptable alternating stress at at least one point of the part when it is subjected to said loading;

an alternating stress acquisition unit configured to acquire the alternating stress at said at least one point; and a verification unit configured to verify for each of said at least one point (s) that the alternating stress is less than the maximum acceptable alternating stress at the point under consideration and for indicating that the part is not qualified if the verification is negative for at least one point.

BRIEF DESCRIPTION OF THE DRAWINGS

The invention can be well understood and its advantages appear better on reading the following detailed description of embodiments given as non-limiting examples. The description refers to the accompanying drawings, in which.

DETAILED DESCRIPTION OF THE INVENTION

Figure 2:
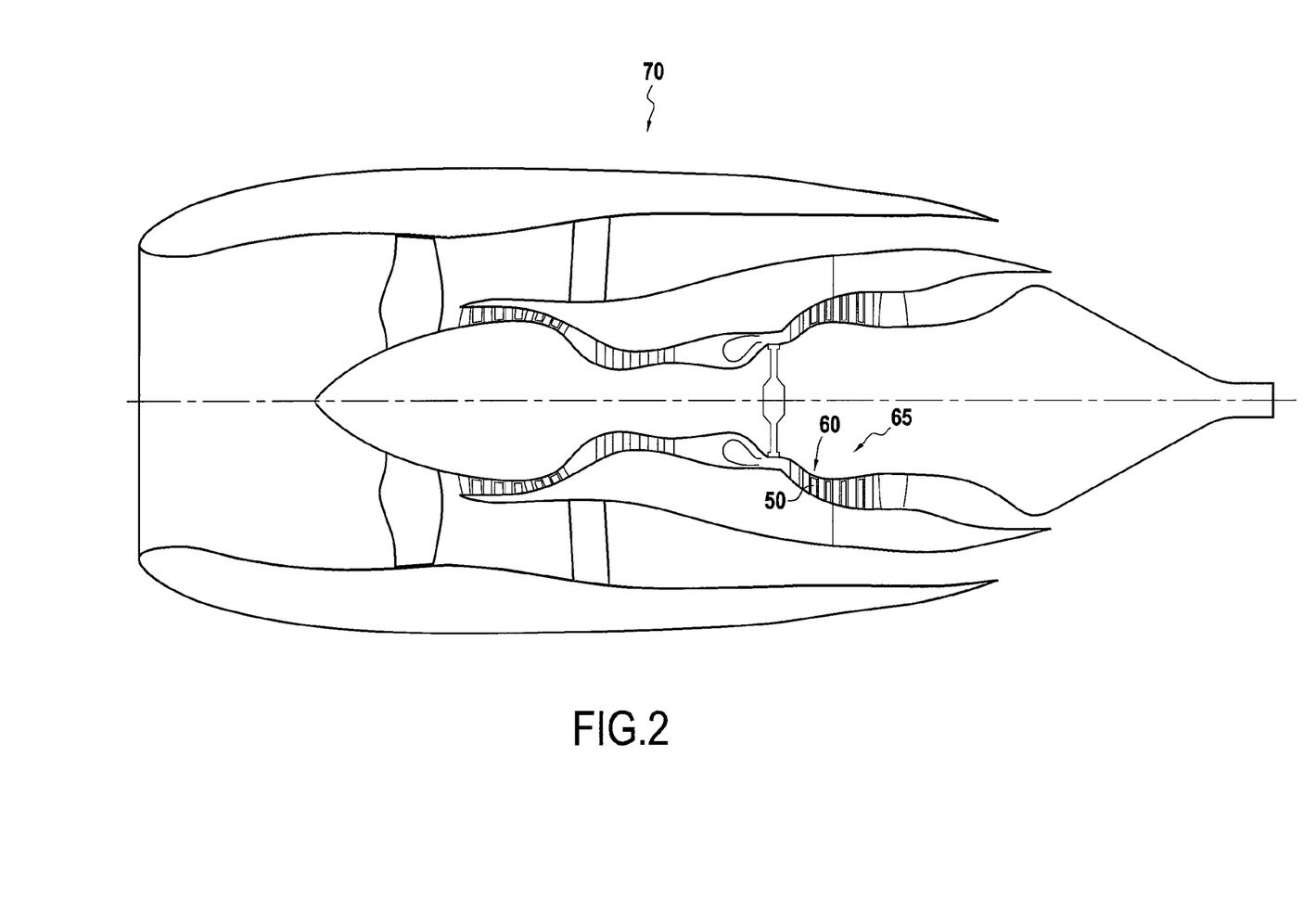
FIG. 2 is a diagrammatic view of a turbine engine in which some of the blades have been verified using an implementation of the method of the invention for verifying the suitability of parts.

The invention is described below in the context of designing a blade 50 of a rotor wheel 60 of a high pressure turbine 65 in a turbine engine 70, as shown in FIG. 2.

Figure 3:
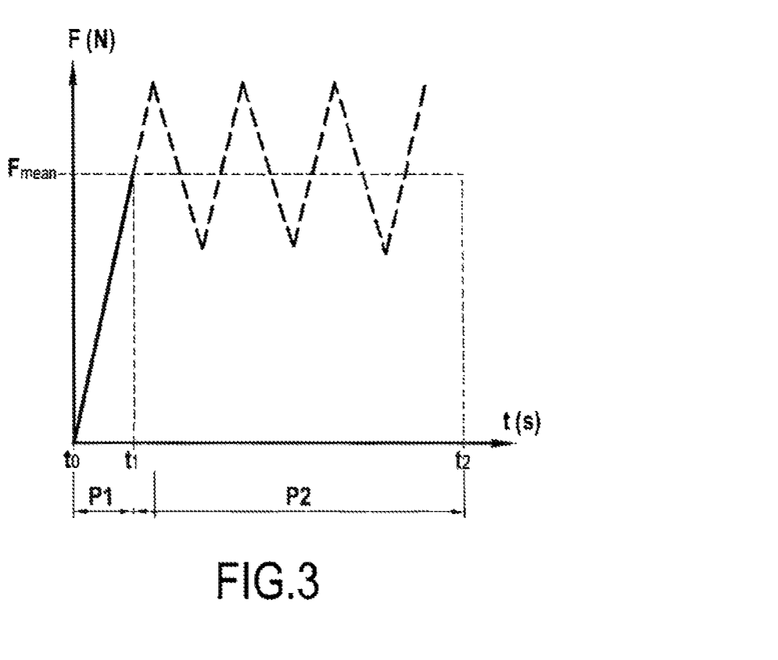
FIG. 3 is a diagrammatic view showing the loading applied to a part, in particular cyclic loading, during a simulation.

The loading to which the blade 50 is exposed while it is in use (i.e. throughout the entire lifetime of the engine 70) is shown in FIG. 3.

This figure shows the variations in the mechanical loading F to which the blade is subjected as a function of time $\underline{t}$ (in seconds). This loading corresponds to a force F (in newtons) acting mainly, but not only, in the longitudinal direction of the blade. The force F is due in particular to the centrifugal force to which the blade is subjected as a result of the rotor wheel rotating; it represents the stresses to which the part is subjected during a "mission" or stage of operation during which the part is in use, which may for example, for an aeroengine part, be a stage of an airplane taking off, etc.

As can be seen in FIG. 3, this loading, apart from a period P1 in which the loading rises, which period extends from an instant t0 to an instant t1, is in the form of loading that is cyclic, varying about a mean value $F_{mean}$.

Figure 4:
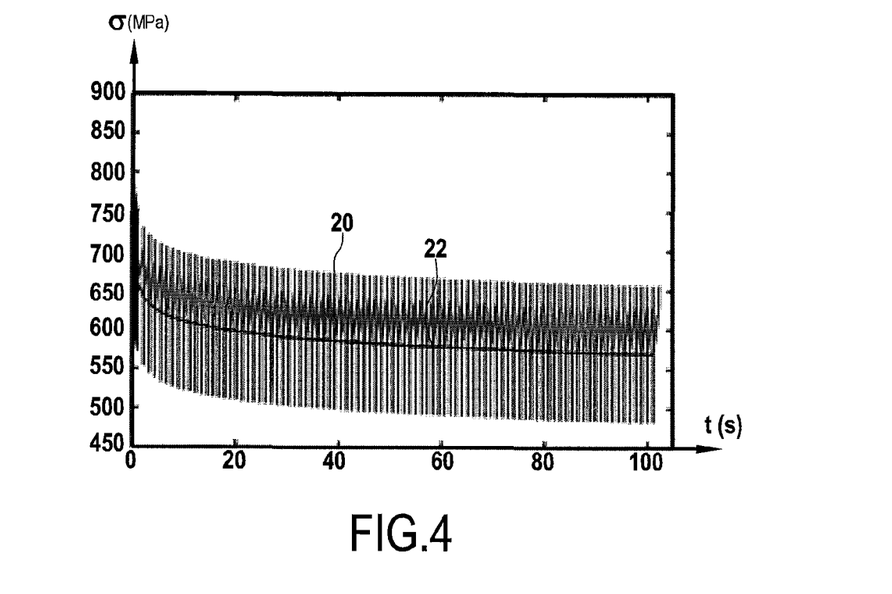
FIG. 4 is a diagrammatic view showing the variations of stress within the part when it is subjected to the loading shown in FIG. 3.

FIG. 4 shows the stress variations at a point P of the blade when it is subjected to the loading shown in FIG. 3. FIG. 4 is shown with a time scale and with proportions that are quite different from those of FIG. 3.

FIG. 4 comprise a first curve 20 representing variations in the stress (total stress) σ at the point P as a function of time $\underline{t}$. It also has a second curve 22 that shows the variations as a function of time in the static stress $\sigma_{stat}$. Curve 22 shows the variations of the mean value of the stress σ (and thus for each cycle, the curve 22 passes through the point having the value of the mean value of stress during that cycle). The curve 22 thus does not take account of high frequency variations in the stress σ.

Two implementations of the method of the invention for determining the maximum acceptable alternating stress are described below with reference to FIGS. 5 to 8 and in particular with reference to FIG. 7.

Figure 5:
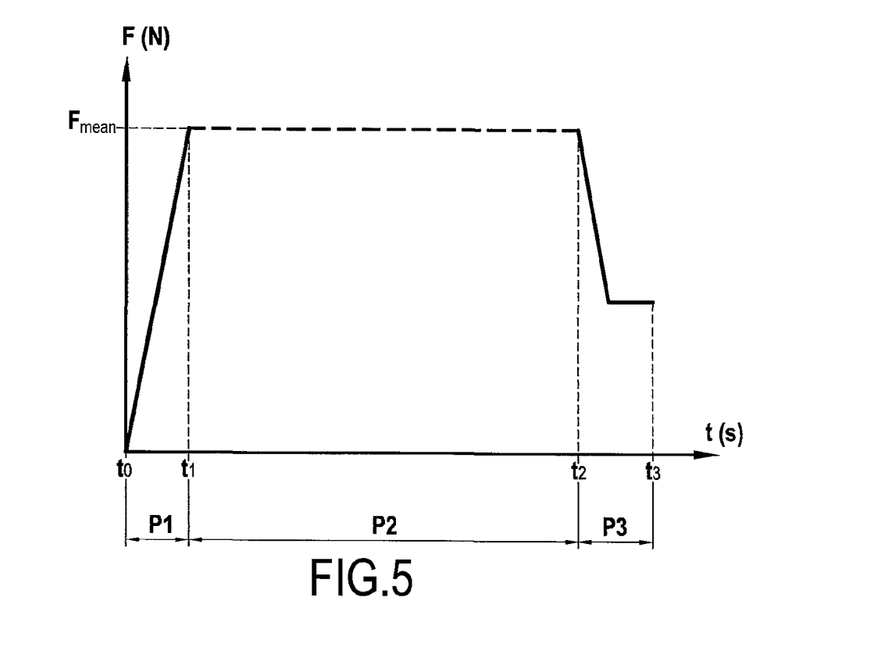
FIG. 5 is a diagrammatic view showing the loading applied to a part, during a simulation performed in an implementation of the method of the invention, the curve including a level portion.
Figure 6:
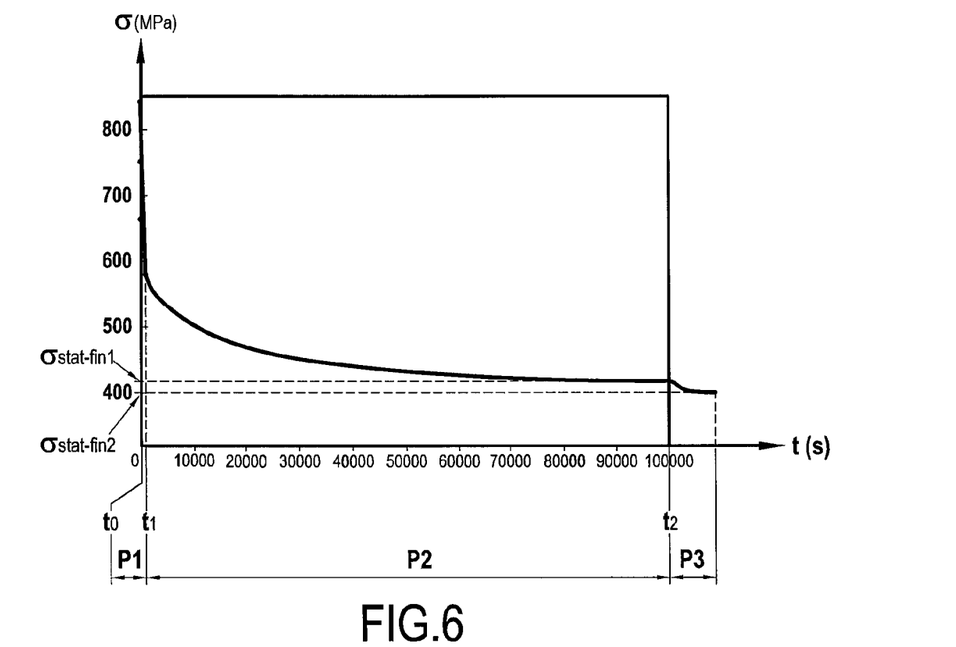
FIG. 6 is a diagrammatic view showing the variations of stress in the part when it is subjected to the loading shown in FIG. 5.

Whereas FIG. 3 shows values of loading F as used in conventional manner for determining the maximum acceptable alternating stress, in contrast, FIGS. 5 and 6 show the loading values and the stresses that are used in accordance with the invention.

Preparing the Simulation

The first step a) of the method, a simulation step, requires the following data to be prepared;
- a digital model of the blade 50;
- a model of the behavior of the material of the blade;
- parameters of the material of the blade; and
- the loading applied to the blade.

The digital model of the blade is defined initially. This model is prepared in a format that makes it possible to perform the simulation step.

The digital model of the blade is generally a three-dimensional model defined by finite elements. In the context of the invention, it is possible to use any kind of modeling for the part for example points connected together by springs, or more generally any digital modeling method capable of simulating the static, quasi-static, and vibratory or dynamic behavior of the part by means of a computer.

Thereafter, the parameters relating to the blade material are determined:

The model for the behavior of the blade material is determined and the parameters of the material of the blade are determined.

In the context of the invention, the behavior model of the material of the blade is an elasto-viscoplastic (EVP) behavior.

For example, the behavior model of the material of the blade may be a viscoplastic flow in the form of a Norton potential.

The loading applied to the blade s also determined.

In the two implementations described herein, the loading to be applied to the blade is initially defined during simulation step a) by means of a diagram such as the diagram shown in FIG. 5.

This diagram shows the variations in the mechanical loading F to which the blade (as an example of a part) is subjected as a function of time $\underline{t}$.

This diagram has a period P1 in which the loading rises between an instant t0 and an instant t1, a level period P2 from the instant t1 to an instant t2, and a final period from the instant t2 to an instant t3.

At the instant t0, the loading (or applied force) F is zero, as is the deformation or movement of the blade.

As from the instant t1 and throughout the level period P2, the loading is constant and equal to a threshold value. The threshold value is generally selected to be equal to the mean value $F_{mean}$ of the loading applied to the blade; this is what FIG. 5 shows. This mean value represents the mean value of the loading during the critical stage of the mission carried out by the part; this mean value is obtained by filtering out or excluding the (vibratory) loading at high frequency The value of the loading during the level period P2 may likewise be selected to be equal to the value of the maximum loading applied to the blade, or it may be selected to be equal to some other value.

The duration of the period P1 during which the loading rises is generally negligible, e.g. being less than ¹⁄₁₀th of the duration of the level period P2. For a blade such as the blade 50, the duration of the period P1 is nevertheless preferably not less than one second. The duration of the level period P2 is discussed below.

The final period P3 is a period representing a final stage of using the blade, e.g. a stage of descending flight.

Although in the example shown, the loading F applied to the blade is mechanical loading, the invention is equally applicable to loading of some other kind, e.g. thermal, etc.

a) Simulating the Operation of the Blade

After preparing all of the elements necessary for simulation, the behavior of the blade is simulated.

The simulation consists in simulating the above-defined loading that is applied to the blade, the blade being made of a specified material, the material of the blade responding in compliance with the selected behavior model.

Advantageously, since the variation in the loading is quite simple, in particular during the level period, the time selected for the simulation may be made discrete using a very small number of time steps.

For example, it is possible to use time steps of increasing durations:

A first time step that is very short, corresponding to the period of increasing load, having a duration t1=2 seconds (s);

followed by five time steps during the level period, of durations that increase exponentially, e.g. successive durations equal respectively to 10 s, 100 s, 1000 s, 10,000 s, and 100,000 s.

The duration of the level period t2 is selected follows:

The frequency $\underline{f}$ of the loading cycles of the machine used for making the Goodman diagram is generally known in advance.

Also known is the number N of loading cycles during which the blade needs to be capable of being used (this number is usually the number of cycles used for making the Goodman diagrams that are drawn up for the part).

The duration D of the loading on the parts used to draw up the Goodman diagrams for the blade material is thus given by:

$$D=N/f$$

In accordance with the invention, during the simulation, the duration t2 of the level period is said to be equal to the above-defined value D. The level period thus has the same duration as the duration of loading for the parts that were used for drawing up the Goodman diagrams(s) for the material.

Furthermore, as mentioned above, FIGS. 5 and 6 correspond to two different implementations.

In the first implementation, the simulation may be interrupted at the end of the level period P2, whereas in the second implementation, the simulation of all three periods P1, P2, and P3 is necessary.

The reason for this difference is explained below.

b) Determining the Final Static Stress

In the first implementation, the final static stress ($\sigma_{stat\_fin}$) is selected for each point P as being the stress at the end of the level, i.e. the stress at the instant t2, at the end of the level period. It is written herein $\sigma_{stat\_fin\_1}$.

In contrast, in the second implementation, the final static stress ($\sigma_{stat\_fin}$) is selected for each point P as being the stress at the instant t3, at the end of the final period P3. It is written herein $\sigma_{stat\_fin\_2}$.

c) Determining the Maximum Acceptable Alternating Stress

In parallel, independently of simulating the behavior of the blade and determining the final static stress $\sigma_{stat\_fin}$, as performed in steps a) and b), a Goodman diagram is drawn up or at least obtained for the material of the part when taken to the temperature T to which the point of the part is taken during the expected operating conditions (i.e. loading conditions).

When a Goodman diagram is not available for the temperature T, a Goodman diagram for the temperature T can be made by interpolating Goodman diagrams that have been made for other temperatures.

The Goodman diagram is made for a certain number of loading cycles to be expected for the part, specifically in the present example $10^7$.

The maximum acceptable alternating stress $\sigma_{alt\_max}$ for the point P under consideration of the blade is then determined merely by selecting the ordinate value of the point of the curve for which the abscissa value is the static stress at the end of the level period.

Figure 8:
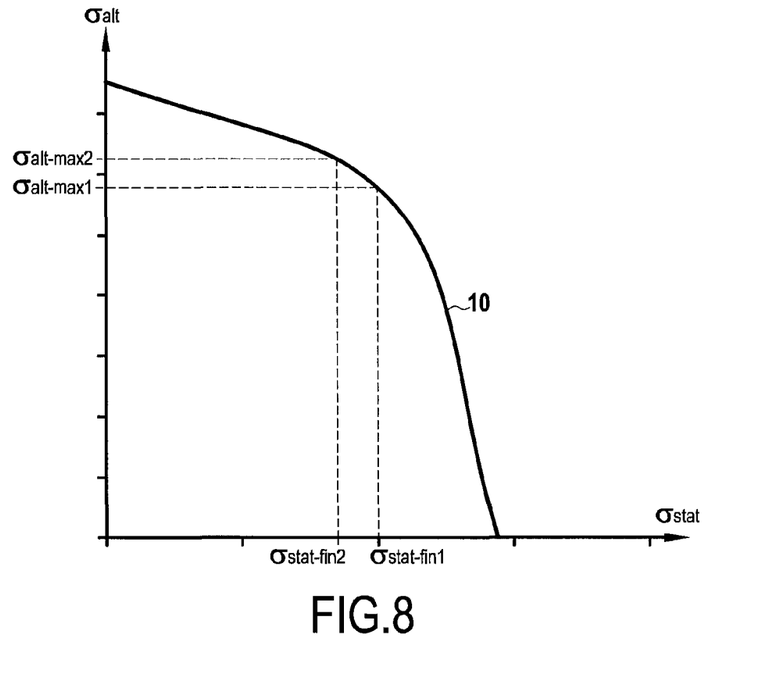
FIG. 8 is an adapted Goodman diagram showing the final step of the FIG. 7 method.

Depending on the, selected implementation, two distinct values are naturally obtained for the maximum acceptable alternating stress, i.e. $\sigma_{alt\_max\_1}$ and $\sigma_{alt\_max\_2}$ (FIG. 8).

Specifically, in this example, and as can be seen in FIG. 6, the stress to which the blade is subjected at instant t2 is greater than the stress to which it is subjected at the instant t3; this therefore gives rise to the following inequality:

$$\sigma_{stat\_fin\_1} > \sigma_{stat\_fin\_2}$$

Since the curve in the Goodman diagram slopes downwards (FIG. 8), it follows, conversely:

$$\sigma_{alt\_max\_1} < \sigma_{alt\_max\_2}$$

This result represents the fact that the maximum acceptable alternating stress obtained by the method is the maximum acceptable alternating stress at the moment selected for the final static stress: since during the final step P3 the static stress decreases, then conversely the maximum acceptable alternating stress $\sigma_{alt\_max}$ increases.

The method of determining the maximum acceptable alternating stress $\sigma_{alt\_max}$ serves to design parts that are subjected to cyclic loading.

Figure 9:
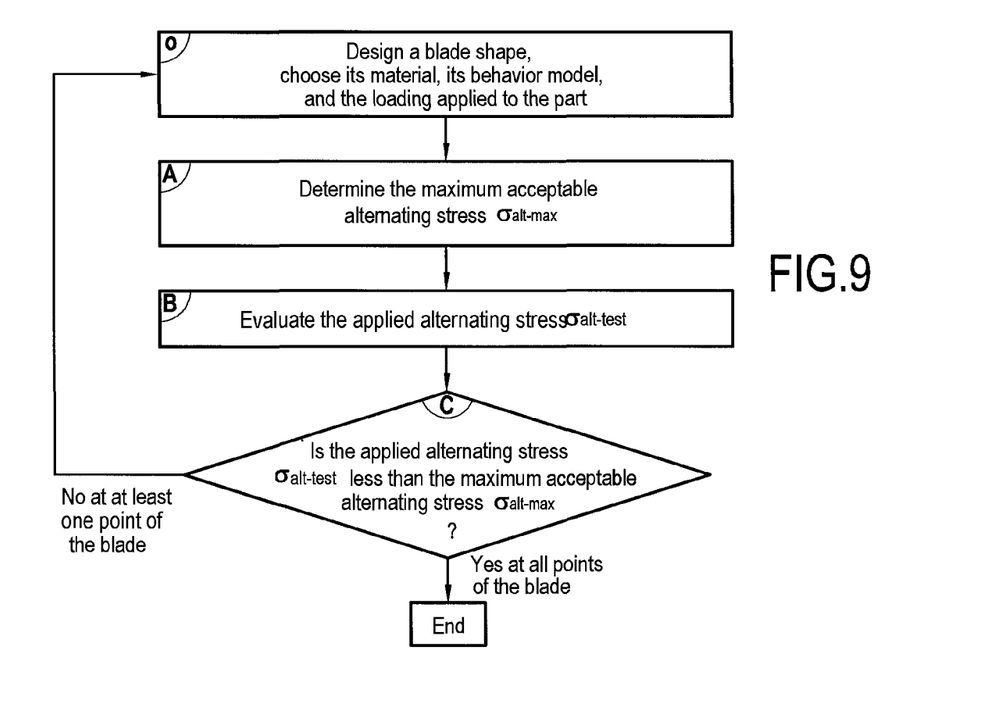
FIG. 9 is a flow chart of a method of the invention for verifying the suitability of a part.

An example of the method for verifying the suitability of parts for being subjected to such loading is described below with reference to FIG. 9.

In this method, the suitability of the part for use is verified by verifying that during use of the part, the stress to which all points of the part (or in reality a certain number of verification points) remains at a value or within a range that is acceptable.

For this purpose, the method of verifying the suitability of parts comprises the following steps:

Firstly the shape of the part is designed or selected (step 0, FIG. 9), which shape is defined in the form of a digital model. The digital model is defined in particular by a certain number of points P, which are the vertices of blocks (or polyhedra) defining the three-dimensional shape of the part.

The material of the part is specified, and a behavior model is selected that is considered as being representative for this material.

Finally, the utilization or working conditions of the part are specified. These conditions include in particular defining all of the loading that is to be applied to the part, whether that loading is mechanical, thermal, conditions at geometrical limits, etc.

The loading is defined as a function of time, and at least during the level period, it presents cyclic variations.

The purpose of the method is to determine whether, for the specified material, and with the specified shape for the part, at various selected points in the part (referred to as "verification points"), the stresses to which the part is subjected during expected operation (while being subjected to the specified loading) will remain within values that are acceptable. For this purpose, the procedure is as follows:

A. At each of the verification points P, the maximum acceptable alternating stress $\sigma_{alt\_max}$ is determined while the part is being subjected to the expected loading, by using the above-described method.

B. The alternating stress to which each of the points P is, in fact, subjected is then evaluated. This evaluation is generally performed by subjecting the part to real tests, and by measuring the alternating stress to which the part is subjected by means of strain gauges or the equivalent. It is thus written $\sigma_{alt\_test}$. This test alternating stress $\sigma_{alt\_test}$ may in particular be the alternating stress at the point P under stabilized operating conditions for the part. It may also be a maximum value for the alternating stress, e.g. the alternating stress at the point P during a takeoff stage, for engine blades in an airplane or a helicopter.

C. For each of the verification points, it is verified that the test alternating stress $\sigma_{alt\_test}$ is less than the maximum acceptable alternating stress $\sigma_{alt\_max}$ at the point in question.

If during step C, at least one point P is found to have a test alternating stress that is greater than the maximum acceptable alternating stress, it is concluded that with the expected shape for the part and with the expected material, it is not possible to obtain a blade suitable for the expected use: it is then necessary to return to step 0 of the method and to modify one of the parameters of the blade, such as its shape, the choice of material, etc.

Figure 7:
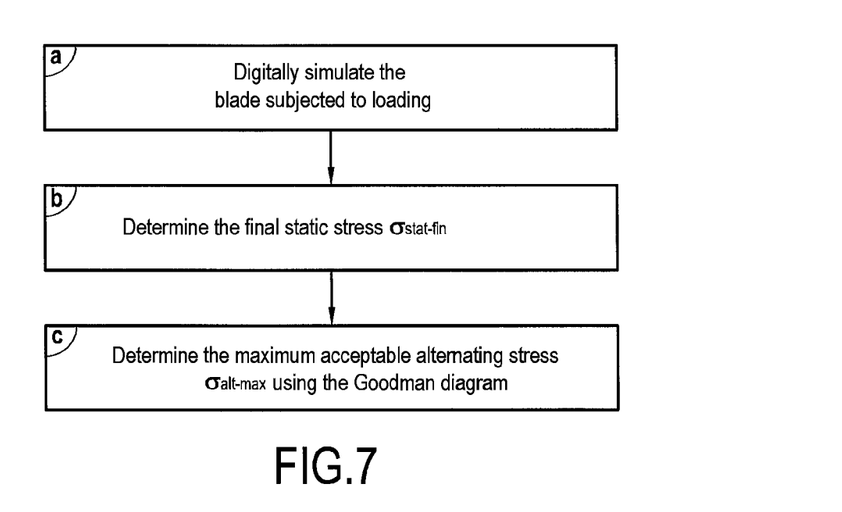
FIG. 7 is a flow chart of a method of the invention for determining the maximum acceptable alternating stress.

The method of determining the maximum acceptable alternating stress described with reference to FIG. 7 is performed by a unit 80 for determining the maximum acceptable alternating stress.

Figure 10:
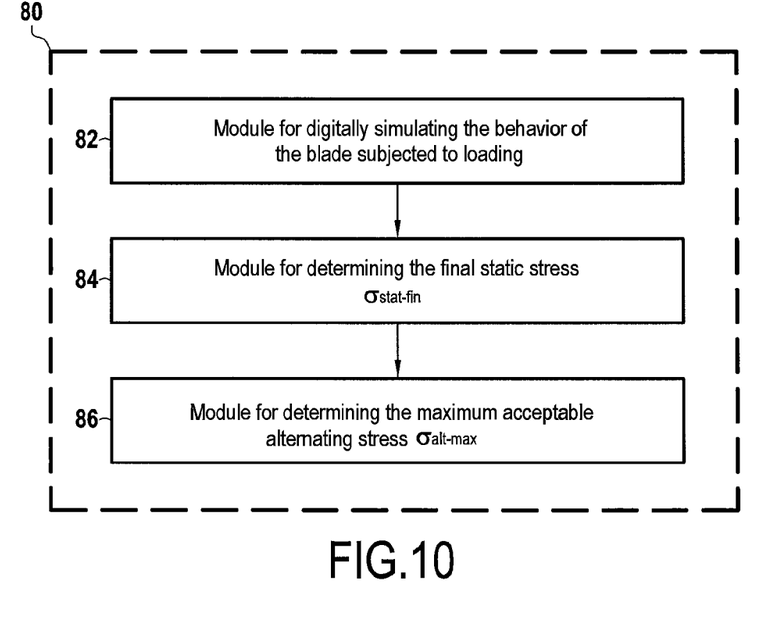
FIG. 10 is a diagrammatic representation of the hardware of a system of the invention for verifying the suitability of a part, the system including a unit for determining a maximum acceptable alternating stress in accordance with the invention.

In order to perform the method, the unit 80 comprises various modules (FIG. 10):

a simulation module 82 for performing the simulation step a);

a determination module 84 for determining the final static stress, which module receives the results of the simulation from the module 82; and on the basis of these results, the module 84 serves to determine the final static stress by using the step b) for the verification points P selected for the part; and a determination module 86 for determining the maximum acceptable alternating stress, which module receives the final static stress from the module 84. The module 86 then serves to perform the step c) and to determine the maximum acceptable alternating stress for the various verification points P.

The unit 80 for determining the maximum acceptable alternating stress itself forms a portion of a broader functional assembly constituting a system 100 for verifying the suitability of a part to be subjected to cyclic loading.

The system 100 serves to perform the method of the invention for verifying the suitability of a part to be subjected to substantially cyclic loading.

Figure 11:
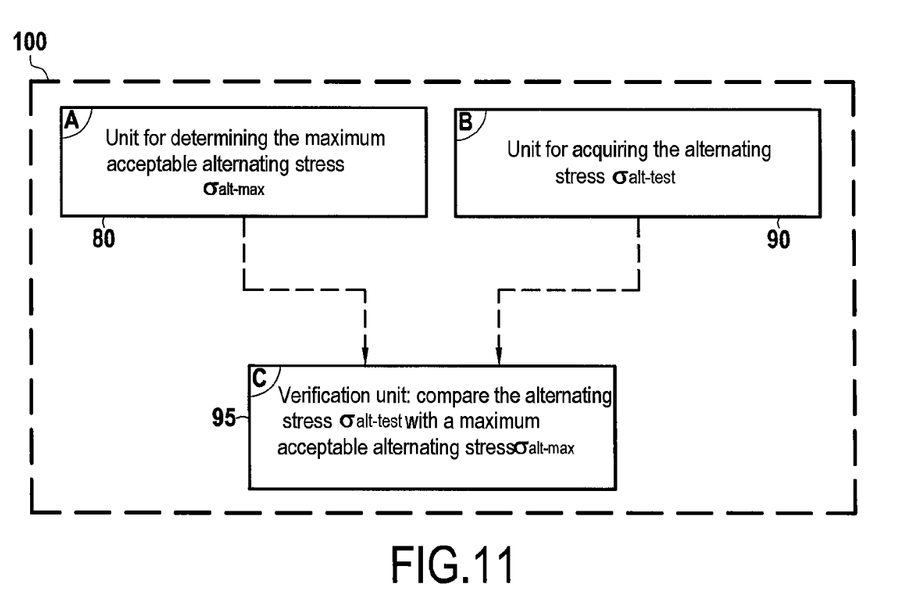
FIG. 11 is a diagrammatic functional representation of a unit of the invention for determining a maximum acceptable alternating stress.

In order to perform the method, the system 100 comprises various units (FIG. 11)

The above-described unit 80. It serves to determine the maximum acceptable alternating stress for each of the verification points P.

An alternating stress acquisition unit 90. The unit 90 is configured to acquire the alternating stress $\sigma_{alt\_test}$ at the various verification points P. The value of the alternating stress may either be produced by calculation, or else it acquired by the unit 90, which value is produced outside the system 100.

A verification unit 95. From the maximum acceptable alternating stress received from the unit 80 and the alternating stress $\sigma_{alt\_max}$ received from the unit 95, the unit 95 verifies for each of the verification points P that the alternating stress $\sigma_{alt\_test}$ at that point is less than the maximum acceptable alternating stress $\sigma_{alt\_max}$. If for at least one of the inspection points P the result of this verification is negative, the verification unit 95 sends information indicating that the part is not suitable for being subjected to the expected loading.

The above-described modules 82, 84, and 86 for simulation, for static stress determination, and for maximum acceptable alternating stress determination in the unit for determining the maximum acceptable alternating stress are software modules implemented within a computer 100.

The computer 100 thus constitutes a unit in the meaning of the invention for determining the maximum acceptable alternating stress.

Furthermore, the evaluation unit 90 and the verification unit 95 as described above are software modules, likewise implemented within the computer 100.

The computer 100 thus constitutes a system in the meaning of the invention for assisting in verifying the suitability of a part to be subjected to loading.

Figure 12:
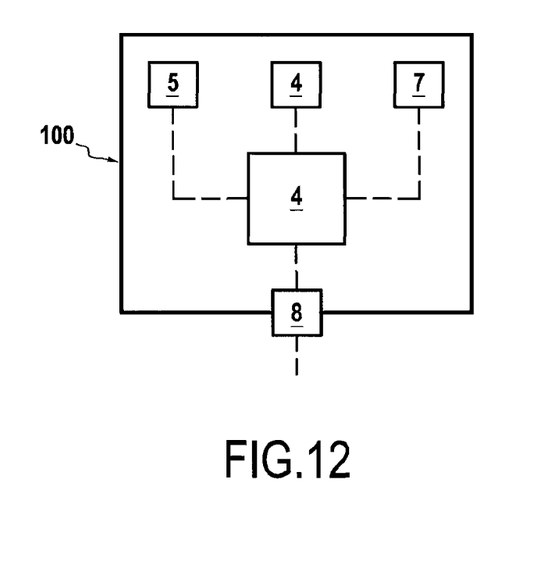
FIG. 12 is a diagrammatic functional representation of a system of the invention for verifying the suitability of a part.

The computer 100 presents the hardware architecture shown diagrammatically in FIG. 12.

It comprises in particular a processor 4, a random access memory (RAM) 5, a ROM 6, a non-volatile flash memory 7, together with communication means 8 enabling the user to communicate with the computer. These hardware elements may possibly be shared with other functional units.

The ROM 6 of the unit 100 constitutes a data medium in accordance with the invention that is readable by the processor 4 and that stores a computer program in accordance with the invention including instructions for executing steps of a method in accordance with the invention for designing a part. The program includes in particular instructions for executing steps of a method in accordance with the invention for determining the maximum acceptable alternating stress.

Although the present invention is described with reference to specific implementations, it is clear that various modifications and changes may be undertaken thereon without going beyond the general ambit of the invention as defined by the claims. By way of example, the invention may be implemented equally well for designing aviation turbine engines or terrestrial turbines or fuel-burning engines, . . . Consequently, the description and the drawings should be considered in a sense that is illustrative rather than restrictive.

The invention claimed is:

1. A determination method for determining a maximum acceptable alternating stress at a point of a part that is to be subjected to substantially cyclic loading, the method comprising:

digitally simulating that the part is subjected, during a level period, to constant loading equal to a threshold value;

taking account during said simulating of an elasto-viscoplastic model of behavior for a material constituting the part at the point under consideration;

from results of the simulating, determining a final static stress at said point at an end of the level period or after the end of the level period; and for the point under consideration, determining the maximum acceptable alternating stress, using a static stress equal to the final static stress as an input in a first Goodman diagram, the maximum acceptable alternating stress being output from the first Goodman diagram, wherein a duration of the level period is substantially equal to a duration of loading of testpieces that were used to draw up said first Goodman diagram.

2. The determination method according to claim 1, wherein the first Goodman diagram is obtained by interpolation between at least two Goodman diagrams.

3. The determination method according to claim 1, wherein the part is a part of a rotary machine.

4. The determination method according to claim 1, wherein the part is a part of an aeroengine for an aircraft, the threshold value for the loading applied during the level period is equal to a mean value of a loading to which the part is subjected during a takeoff of the aircraft.

5. The determination method according to claim 1, wherein:
the method comprises simulating digitally that the part, after the level period, is subjected to varying loading during a final period after the level period; and
the final static stress determined is an end-of-final-period stress at said point at the end of said final period.

6. The determination method according to claim 1, wherein:
the method comprises simulating digitally that the part, prior to the level period, is subjected to loading varying from a zero value up to the threshold value during a period of rising load.

7. A method of verifying the suitability of a part for being subjected to substantially cyclic loading, the method comprising:
determining a maximum acceptable alternating stress at at least one point of the part when the part is subjected to said loading, using the method according to claim 1;
evaluating at said at least one point of the part, an alternating stress to which the part is subjected at said at least one point; and
for said at least one point, verifying that the alternating stress is less than the maximum acceptable alternating stress at the point under consideration, and concluding that the part is not suitable for being subjected to said loading when the verification is negative for at least one point.

8. A non-transitory computer readable medium including program code instructions for executing the method according to claim 1 when executed on a computer.

9. A determination unit for determining a maximum acceptable alternating stress at a point of a part that is to be subjected to substantially cyclic loading, the unit comprising:
a processor configured to
simulate digitally that the part is subjected to constant loading equal to a threshold value during a level period;
take account of an elasto-viscoplastic behavior model for a material constituting the part at the point under consideration;
determine a final static stress at said point of the part at the end of the level period or after the end of the level period; and
determine the maximum acceptable alternating stress using a static stress equal to the final static stress as an input in a first Goodman diagram, the maximum acceptable alternating stress being output from the first Goodman diagram,
wherein a duration of the level period is substantially equal to a duration of loading of testpieces that were used to draw up said first Goodman diagram.

10. A system for assisting in verifying the suitability of a part for being subjected to substantially cyclic loading, the system comprising:
a determination unit according to claim 9 for determining a maximum acceptable alternating stress and configured to determine a maximum acceptable alternating stress at at least one point of the part when the part is subjected to said loading; and
a processor configured to
acquire an alternating stress at said at least one point; and
verify for said at least one point that the alternating stress is less than the maximum acceptable alternating stress at the point under consideration and indicate that the part is not qualified when the verification is negative for at least one point.

* * * * *

UNITED STATES PATENT AND TRADEMARK OFFICE
CERTIFICATE OF CORRECTION

PATENT NO. : 10,984,153 B2  
APPLICATION NO. : 15/748024  
DATED : April 20, 2021  
INVENTOR(S) : Geoffrey Juan Desmeure et al.

Page 1 of 1

It is certified that error appears in the above-identified patent and that said Letters Patent is hereby corrected as shown below:

On the Title Page

Item (73), the Assignee's country of residence is incorrect. Item (73) should read:  
--(73) Assignee: SAFRAN AIRCRAFT ENGINES, Paris (FR)--

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*